United States Patent
Jung et al.

(10) Patent No.: US 11,870,107 B2
(45) Date of Patent: Jan. 9, 2024

(54) FUEL CELL STACK

(71) Applicant: LG CHEM, LTD., Seoul (KR)

(72) Inventors: Hye Mi Jung, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 733 days.

(21) Appl. No.: 16/481,185

(22) PCT Filed: Jan. 26, 2018

(86) PCT No.: PCT/KR2018/001161
§ 371 (c)(1),
(2) Date: Jul. 26, 2019

(87) PCT Pub. No.: WO2018/143610
PCT Pub. Date: Aug. 9, 2018

(65) Prior Publication Data
US 2019/0393517 A1    Dec. 26, 2019

(30) Foreign Application Priority Data

Jan. 31, 2017  (KR) .......................... 10-2017-0013514

(51) Int. Cl.
*H01M 8/0258* (2016.01)
*H01M 8/0267* (2016.01)
(Continued)

(52) U.S. Cl.
CPC ....... *H01M 8/0258* (2013.01); *H01M 8/0267* (2013.01); *H01M 8/1004* (2013.01); *H01M 8/241* (2013.01); *H01M 2008/1095* (2013.01)

(58) Field of Classification Search
CPC .. H01M 8/0258; H01M 8/026; H01M 8/0263; H01M 8/0265; H01M 8/0267; H01M 8/0247
See application file for complete search history.

(56) References Cited

U.S. PATENT DOCUMENTS

2003/0215695 A1   11/2003   Suzuki et al.
2006/0110651 A1*  5/2006    Wakahoi ............. H01M 8/0276
                                                       429/514
(Continued)

FOREIGN PATENT DOCUMENTS

CN    1636296 A    7/2005
CN    1638177 A    7/2005
(Continued)

OTHER PUBLICATIONS

Extended European Search Report corresponding to EP 18747220.4; dated Feb. 20, 2020 (8 pages).
(Continued)

*Primary Examiner* — Pamela H Weiss
*Assistant Examiner* — Amanda Rosenbaum
(74) *Attorney, Agent, or Firm* — Myers Bigel, P.A.

(57) ABSTRACT

Fuel cell stacks may include a plurality of fuel cells including a membrane-electrode assembly that includes an anode electrode and a cathode electrode, gas diffusion layers respectively on opposing sides of the membrane-electrode assembly, a first separating plate having a first surface facing the anode electrode so as to be in contact with the gas diffusion layer and a second surface opposite to the first surface, and a second separating plate having a first surface facing the cathode electrode so as to be in contact with the gas diffusion layer and a second surface opposite to the first surface. At least one of the second surface of the first separating plate and the second surface of the second separating plate may include one or more protrusions protruding therefrom outwardly.

11 Claims, 6 Drawing Sheets

(51) Int. Cl.
  *H01M 8/1004* (2016.01)
  *H01M 8/241* (2016.01)
  *H01M 8/10* (2016.01)
  *H01M 8/0247* (2016.01)
  *H01M 8/0254* (2016.01)

(56) References Cited

U.S. PATENT DOCUMENTS

| | | | | |
|---|---|---|---|---|
| 2006/0204807 | A1* | 9/2006 | Kosaka | H01M 8/241 |
| | | | | 429/457 |
| 2008/0268315 | A1* | 10/2008 | Na | H01M 8/0206 |
| | | | | 429/492 |
| 2011/0256462 | A1* | 10/2011 | Jung | H01M 8/0258 |
| | | | | 429/514 |
| 2012/0115072 | A1* | 5/2012 | Jeong | H01M 8/0273 |
| | | | | 429/534 |
| 2012/0282539 | A1* | 11/2012 | Oda | H01M 8/0276 |
| | | | | 429/482 |
| 2014/0017582 | A1 | 1/2014 | Hashimoto et al. | |
| 2014/0147765 | A1 | 5/2014 | Suzuki | |
| 2017/0025688 | A1 | 1/2017 | Ikeda et al. | |
| 2017/0194659 | A1* | 7/2017 | Jin | H01M 8/0254 |
| 2019/0109333 | A1* | 4/2019 | Okui | H01M 8/12 |

FOREIGN PATENT DOCUMENTS

| | | |
|---|---|---|
| CN | 104393322 A | 3/2015 |
| JP | 2006252803 A | 9/2006 |
| JP | 2009105005 A | 5/2009 |
| JP | 5042507 | 10/2012 |
| JP | 2016164854 A | 9/2016 |
| JP | 6045980 | 12/2016 |
| KR | 0785115 | 12/2007 |
| KR | 20140086152 | 7/2014 |
| KR | 20150017402 | 2/2015 |
| KR | 20150126742 | 11/2015 |
| KR | 20170003275 | 1/2017 |

OTHER PUBLICATIONS

Japanese Office Action corresponding to JP 2019-541099; dated Aug. 27, 2020 (10 pages, including machine English translation).
International Search Report of the International Searching Authority corresponding to PCT/KR2018/001161, dated May 2, 2018. (7 pages with English translation).

* cited by examiner

FUEL CELL STACK

CROSS REFERENCE TO RELATED APPLICATIONS

This application is a 35 U.S.C. § 371 national stage application of PCT International Application No. PCT/KR2018/001161, filed Jan. 26, 2018, which claims priority from Korean Patent Application No. 10-2017-0013514, filed Jan. 31, 2017, the contents of which are incorporated herein in their entireties by reference. The above-referenced PCT International Application was published in the Korean language as International Publication No. WO 2018/143610 A1 on Aug. 9, 2018.

TECHNICAL FIELD

The present invention relates to a fuel cell stack.

BACKGROUND ART

Generally, a fuel cell is an energy conversion device that generates electric energy through an electrochemical reaction between a fuel and an oxidizer, which has an advantage that power can be continuously generated as long as the fuel is continuously supplied.

A polymer electrolyte membrane fuel cell (PEMFC), which uses a polymer membrane capable of permeating hydrogen ions, as an electrolyte, has an operating temperature of about 100° C. or lower, which is lower than other types of fuel cells, and has advantages of high energy conversion efficiency and power density and quick response characteristics. In addition, since it can be miniaturized, it can be provided as portable, vehicle and household power units.

The polymer electrolyte membrane fuel cell stack has a structure in which a plurality of fuel cells are stacked, wherein each of the fuel cells may comprise a membrane-electrode assembly (MEA) equipped with an electrode layer formed by coating an anode and a cathode around an electrolyte membrane composed of a polymer material, respectively, a gas diffusion layer (GDL) functioning to distribute reactive gases evenly throughout a reaction zone and to transfer electrons generated by oxidation reaction of the anode electrode toward the cathode electrode, a separating plate (bipolar plate) for supplying reactive gases to the gas diffusion layer and discharging the water generated by the electrochemical reaction to the outside, and a gasket of an elastic material disposed on the outer periphery of the reaction zone of the separating plate or the membrane-electrode assembly to prevent leakage of reactive gases and cooling water.

Conventional separating plates, in which reactive gas channels and cooling water channels are provided on both surfaces, have technical problems of water transfer imbalance in the fuel cell and high mass transfer resistance (usually diffusion resistance) of the reactive gases in the reaction surface in a high power zone.

In addition, recently, a separating plate to which metal foams, metal meshes and expanded metals have been applied (hereinafter, also referred to as a "porous body") has been proposed in order to improve a performance of the fuel cell through reduction of the diffusion resistance in a high-power operating zone, but since the shape and structure of the porous body act as an important factor for determining flow characteristics of cooling water supply flow paths, studies for improving the cooling water flow paths of the porous body are required.

DISCLOSURE

Technical Problem

It is a problem to be solved by the present invention to provide a fuel cell stack capable of reducing pressure loss in reactive gas and cooling water flow paths.

In addition, it is another problem to be solved by the present invention to provide a fuel cell stack capable of improving cooling performance and structural reinforcement for compression fastening upon stacking fuel cells.

Technical Solution

To solve the above-described problems, according to one aspect of the present invention, there is provided a fuel cell stack comprising a plurality of fuel cells, wherein the fuel cell comprises a membrane-electrode assembly having an anode electrode and a cathode electrode, gas diffusion layers each disposed on both sides of the membrane-electrode assembly, a first separating plate having a first surface facing the anode electrode side so as to be in contact with the gas diffusion layer and a second surface opposite to the first surface, and a second separating plate having a first surface facing the cathode electrode side so as to be in contact with the gas diffusion layer and a second surface opposite to the first surface, and at least one of the second surface of the first separating plate and the second surface of the second separating plate is provided with one or more protrusions protruding to the outside.

Advantageous Effects

As described above, the fuel cell stack related to one embodiment of the present invention has the following effects.

The fluid resistance of the cooling water entry part can be reduced, the power consumption of fluid instruments connected to cooling performance improvement and cooling water supply systems can be reduced and the performance, stability and power generation efficiency of the fuel cell system can be improved.

MODE FOR INVENTION

Hereinafter, a fuel cell stack according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
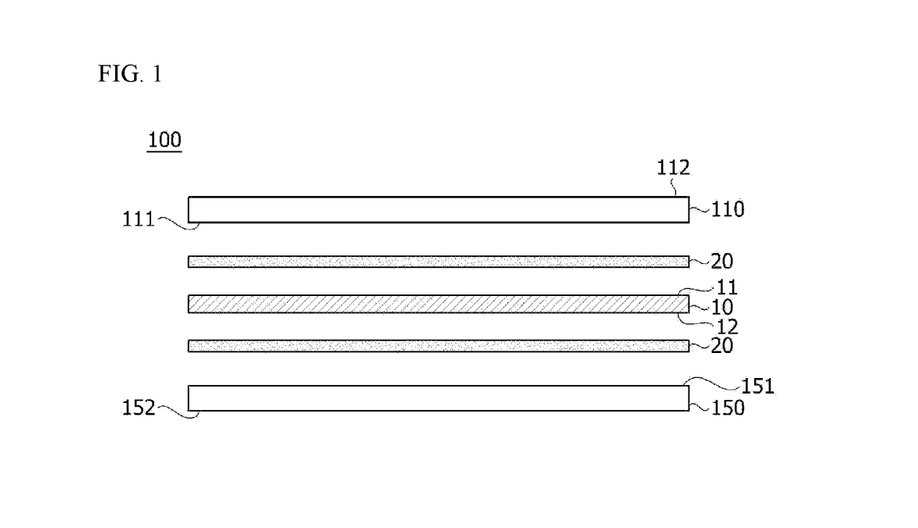
FIGS. 1 and 2 are conceptual diagrams of a fuel cell stack related to one embodiment of the present invention.
Figure 2:
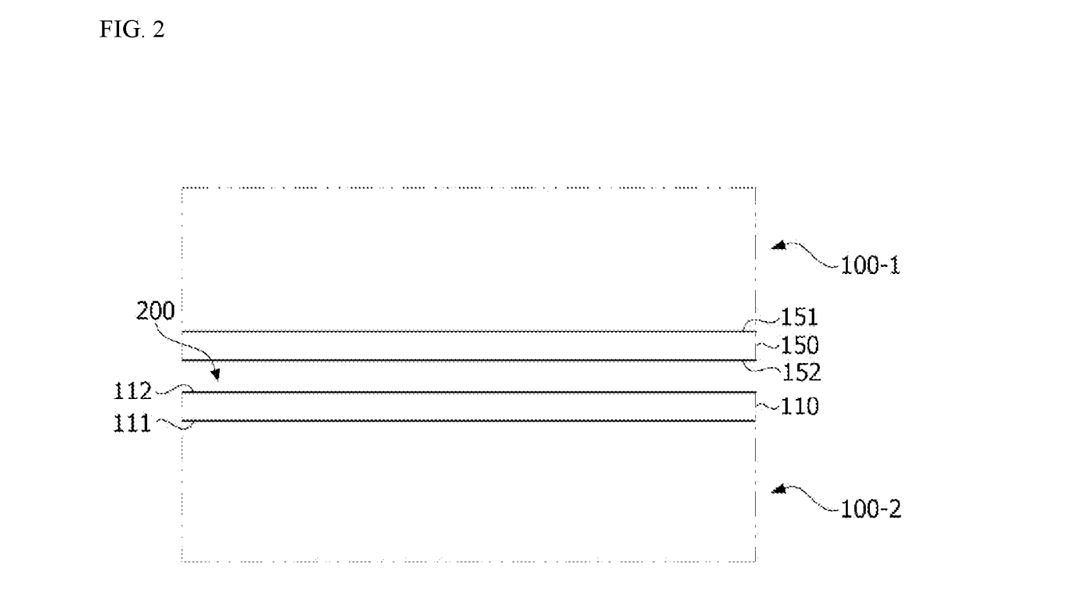
Figure 3:
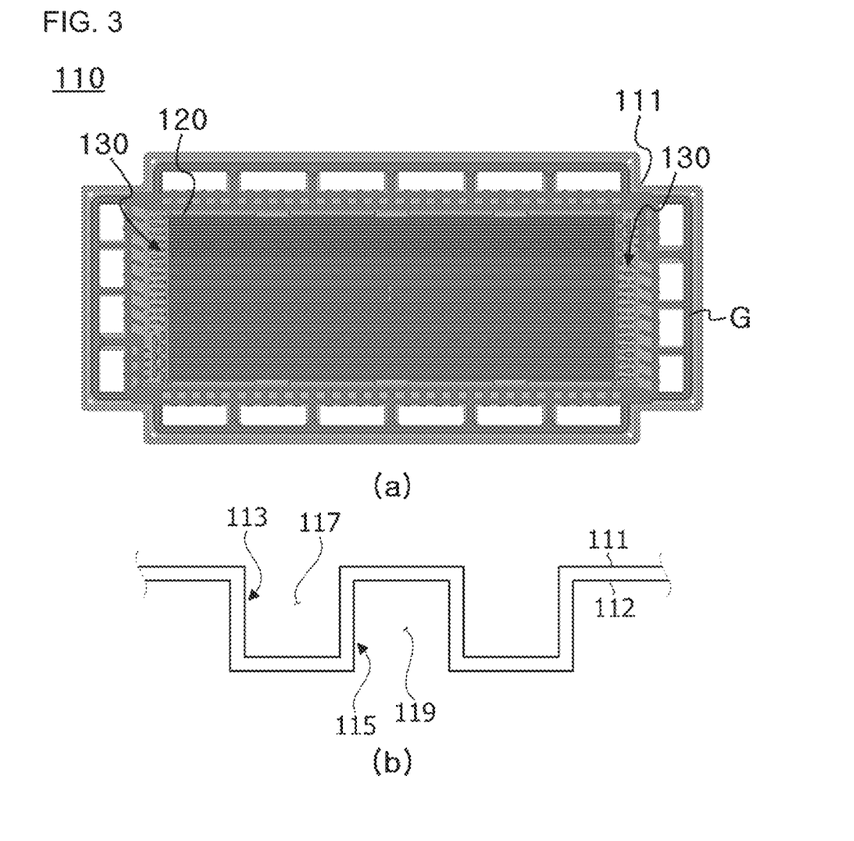
FIG. 3 is a plan view a main part sectional view showing a first separating plate.
Figure 4A:
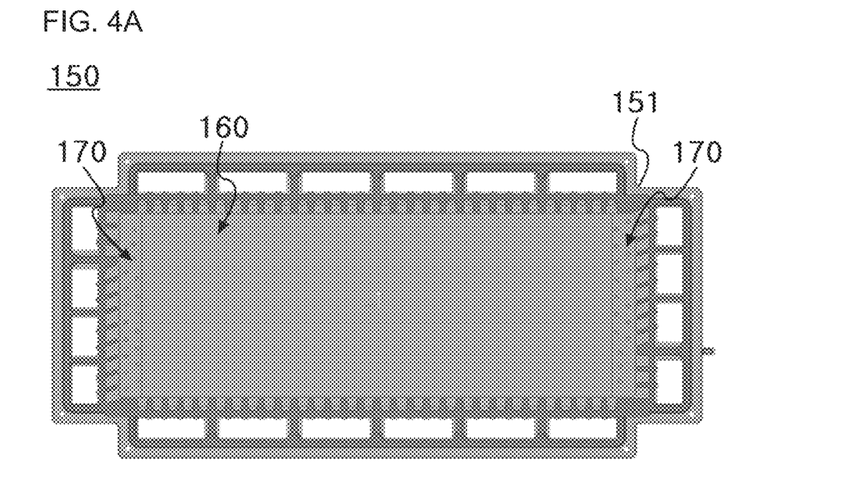
FIGS. 4A and 4B are plan views showing a second separating plate.
Figure 4B:
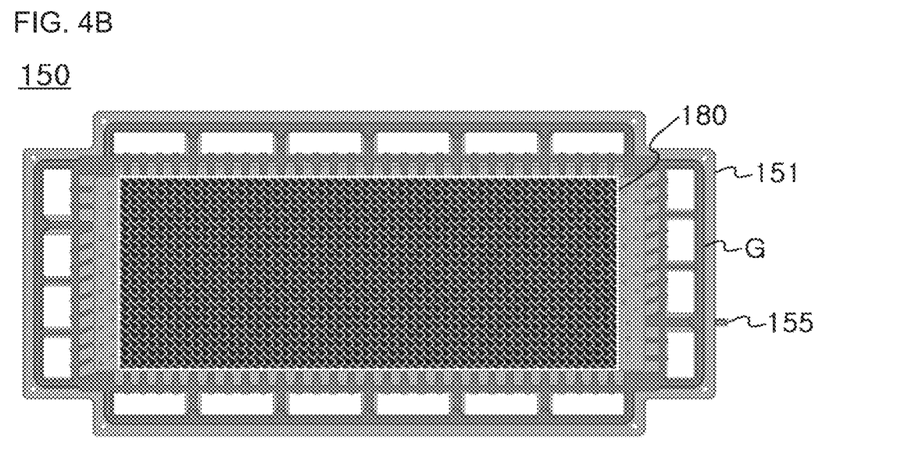

FIGS. 1 and 2 are conceptual diagrams of a fuel cell stack according to one embodiment of the present invention, FIG. 3 is a plan view and a main part sectional view showing a first separating plate (110), and FIGS. 4A and 4B are plan views showing a second separating plate (150).

Figure 5:
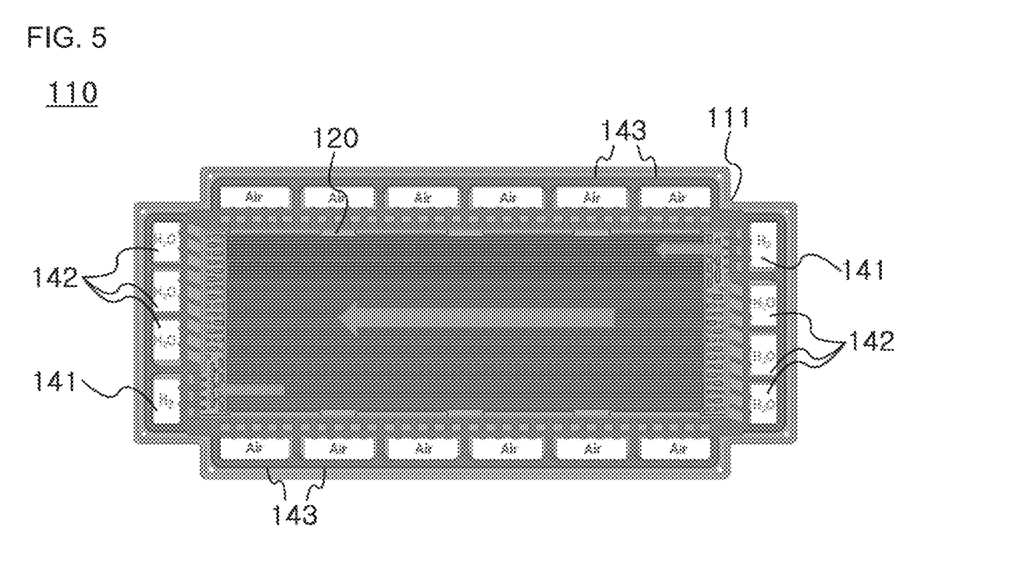
FIG. 5 is a view showing flow of a fuel gas in the first separating plate.
Figure 6:
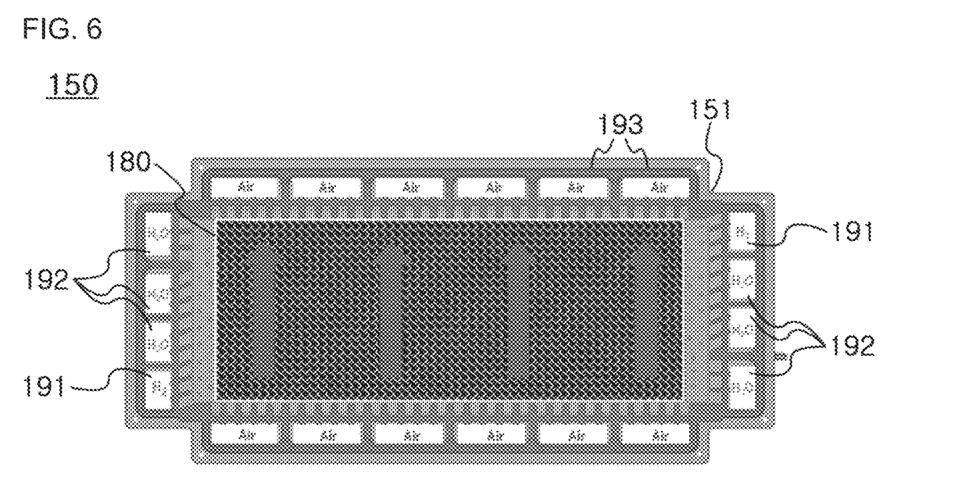
FIG. 6 is a view showing flow of an oxidizing gas in the second separating plate.
Figure 7A:
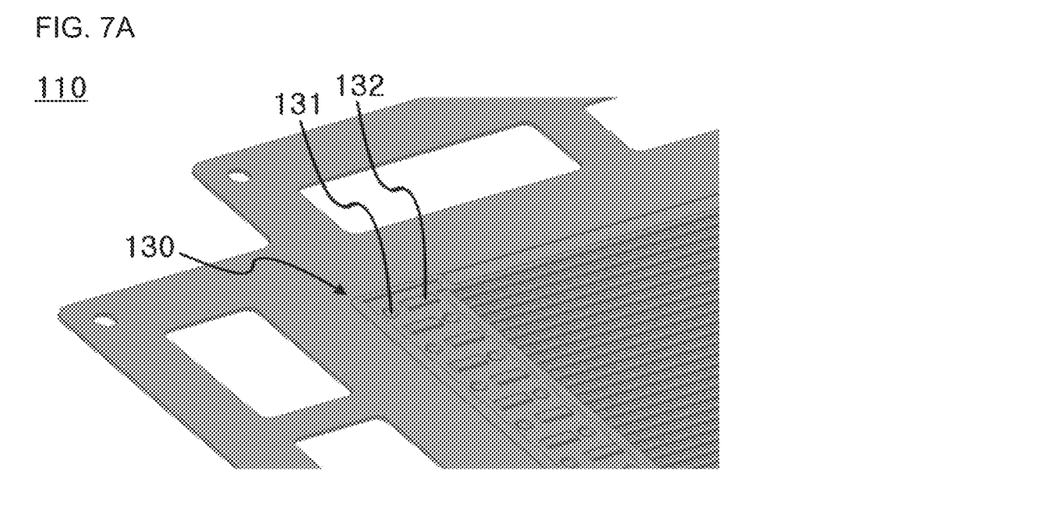
FIGS. 7A and 7B are main part perspective views showing first protrusions and a second protrusion.
Figure 7B:
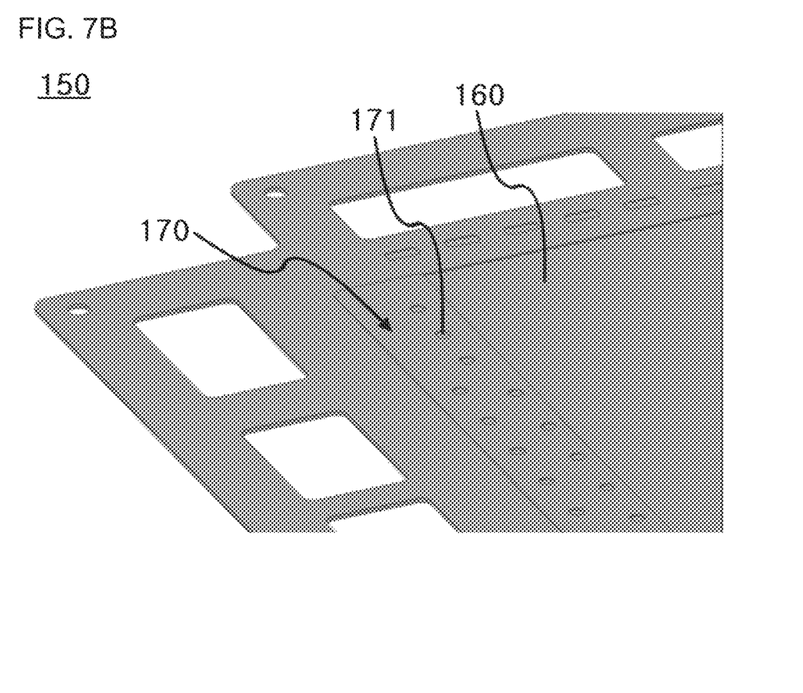

Furthermore, FIG. 5 is a view showing flow of a fuel gas in the first separating plate (110), FIG. 6 is a view showing flow of an oxidizing gas in the second separating plate (150), and FIGS. 7A and 7B are main part perspective views showing first protrusions and a second protrusion.

Figure 8:
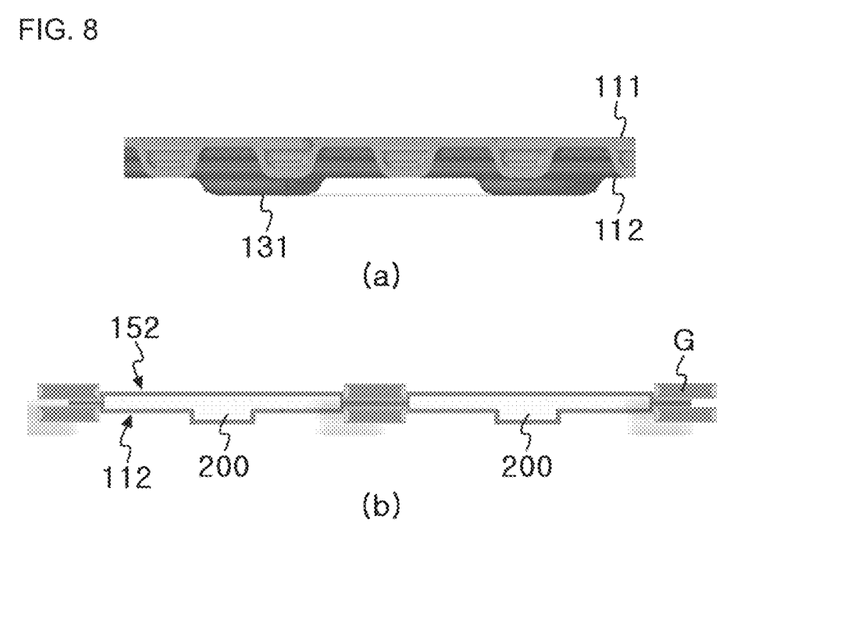
FIG. 8 is a view for explaining cooling water flow paths.
Figure 9:
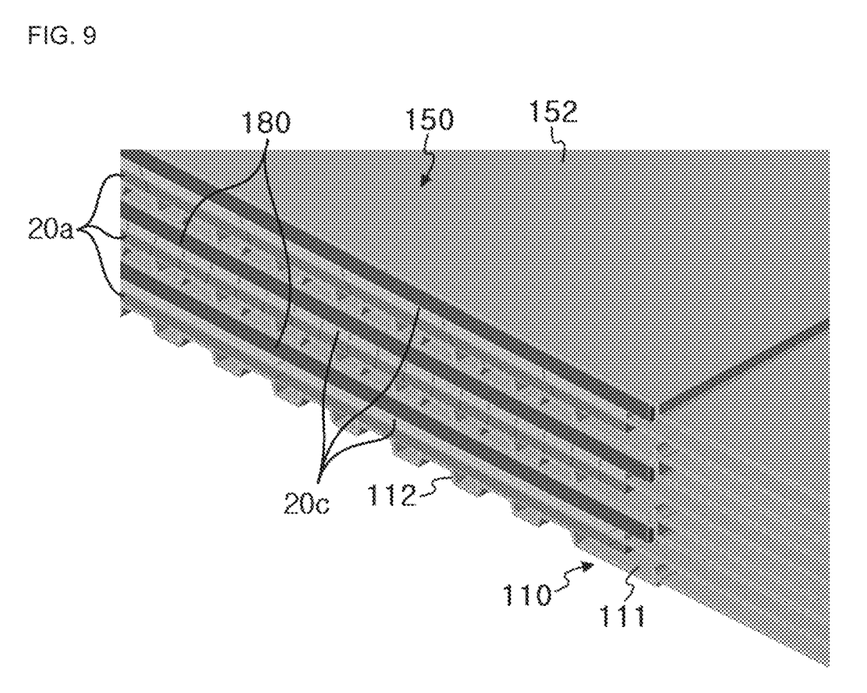
FIG. 9 is an incised perspective view of the fuel cell stack.

In addition, FIG. 8 is a view for explaining cooling water flow paths, and FIG. 9 is an incised perspective view of the fuel cell stack.

The fuel cell stack according to one embodiment of the present invention comprises a plurality of fuel cells (100, 100-1, 100-2).

Referring to FIG. 1, the fuel cell (100) comprise a membrane-electrode assembly (10) having an anode electrode (11) and a cathode electrode (12), and gas diffusion layers (20a and 20c) disposed on both sides of the membrane-electrode assembly.

In FIG. 9, the anode-side gas diffusion layer (20a) and the cathode-side gas diffusion layer (20c) are shown.

Also, the fuel cell (100) comprises a first separating plate (110) having a first surface (111) facing the anode electrode (11) side so as to at least partly be in contact with the gas diffusion layer (20a) and a second surface (112) opposite to the first surface.

Furthermore, the fuel cell (100) comprise a second separating plate (150) having a first surface (151) facing the cathode electrode (12) side so as to at least partly be in contact with the gas diffusion layer (20c) and a second surface (152) opposite to the first surface (151).

In addition, at least one of the second surface (112) of the first separating plate (110) and the second surface (152) of the second separating plate (150) is provided with one or more of protrusions (131, 132, 171) projecting outwardly. The meaning that the protrusions (131, 132, 171) protrude to the outside means that they protrude outwardly from the second surface.

Also, the plurality of fuel cells (100, 100-1, 100-2) have the same structure.

Referring to FIG. 2, in the fuel cell stack, two adjacent fuel cells (100-1, 100-2) are stacked so that the second surface (112) of the first separating plate (110) of any one fuel cell (100-2) and the second surface (152) of the second separating plate (150) of the remaining fuel cell (100-1) are opposed to each other. The second surface (112) of the first separating plate (110) and the second surface (152) of the second separating plate (150) are also spaced apart from each other at a predetermined interval by the protrusions, where the cooling water is supplied to the space (200) therebetween.

Furthermore, the first separating plate (110) may be provided with one or more first protrusions (131, 132) protruding outwardly on the second surface (112). Also, the second separating plate (150) may be provided with one or more second protrusions (171) protruding outwardly on the second surface (152) so as to be in contact with the first protrusions (131, 132). For example, upon stacking the fuel cells, the first projections (131, 132) and the second projections (171) may be provided to be in contact with each other in a 1:1 corresponding structure. Through the 1:1 corresponding structure, it is possible to contribute to cooling performance and structural reinforcement for compression fastening.

In such a structure, the cooling water flow space (200) between the two adjacent fuel cells (100-1,100-2) has a thickness above the sum of the heights of the first protrusion (131) and the second protrusion (171).

With reference to FIGS. 3 and 5, the structure of the first separating plate (110) and the flow of the fuel gas will be described.

The first separating plate (110) has a reaction zone (120) comprising a plurality of first channels (113), through which a fuel gas (hydrogen) flows, on the first surface (111), and comprises a second channel (115) provided between two adjacent first channels (113) on the second surface (112) such that the cooling water flows. Also, the first channel (113) forms a flow space (117) of the fuel gas and the second channel (115) forms a flow space (119) of the cooling water.

Also, the first separating plate (110) is provided with fuel gas inlets/outlets (141) and cooling water inlets/outlets (142) located on both sides in the longitudinal direction of the first channel, and oxidizing gas inlets/outlets (143) located on both sides in the width direction of the first channel, respectively.

Furthermore, the first channel (113) and the second channel (115) may be elongated along the flow direction of the fuel gas, respectively. Also, two adjacent first channels (113) may be connected through the second channel (115). In addition, the first separating plate (110) is surface-structured such that the first surface (111) and the second surface (112) each have a flow path.

For example, the first separating plate (110) may be a stamp-molded metal separating plate. Also, the first channel (113) and the second channel (115) may have an inside and outside inverted structure. Specifically, the first separating plate (110) has a structure that on molding process characteristics, if the first channel for supplying the fuel gas is formed on the first surface, the second channel for supplying the cooling water is dependently determined on the second surface. According to such a linear flow path structure, in particular, the flow resistance of the reaction gas (hydrogen) and the cooling water flowing in excess in the high power zone can be reduced.

In addition, the plurality of first protrusions (131, 132) may be provided at the edge of the first separating plate (110) so as not to be located in the reaction zone (120). Specifically, the plurality of first protrusions (131, 132) may be located on one side of the reaction zone (120) and may be provided in the distribution zone (130) for distributing the fuel gas to each channel of the reaction zone (120). The first protrusions (131, 132) perform a function to improve distribution uniformity of the reactive gas together.

On the other hand, the first projections (131, 132) may have a circular or rectangular section. For example, the first protrusion (131) protruding out of the first surface may have a rectangular section, and the first protrusion (132) protruding out of the second surface may have a circular section. Furthermore, the first protrusions (132) protruding out of the second surface comes into contact with the second protrusions (171) of the second separating plate. Thus, by forming the protrusions having various shapes in the distribution zone (130) in a predetermined arrangement, the flow loss of the fuel/cooling water inlets/outlets can be reduced and the uniformity of the flow distribution can be improved. The distribution zone (130) performs a flow buffering/distributing function. In addition, the first separating plate (110) is provided with a gasket (G) for sealing the reaction zone and the inlets/outlets, and the like.

On the other hand, in the second surface (152) of the second separating plate (150), the surface facing the second channel (115) of the first separating plate (110) may be formed as a flat surface. Also, the second channel (115) of the first separating plate (110) does not contact the second surface (152) of the second separating plate (150) when the first protrusions (131, 132) and the second protrusions (171) are in contact with each other.

Hereinafter, the structure of the second separating plate (150) and the flow of the oxidizing gas (oxygen) will be described with reference to FIGS. 4A, 4B, and 6.

The second separating plate (150) is equipped with a reaction zone (160), where a porous body (180) having a plurality of holes is positioned so that oxidizing gas flows, on the first surface (151) and the second surface (152) is formed as a flat surface. That is, in the second separating plate (150), the first surface (151) is surface-structured for the flow of the oxidizing gas.

Specifically, in the first separating plate (110), a number of channels (113) are directly molded in the reaction zone (120), but the second separating plate (150) has a structure that the porous body (180) bonded on the flat surface forms the reaction zone (160). in the second separating plate (150), a metal porous body (180) (the metal porous body 180 in FIG. 9) may be bonded to the first surface. at this time, the porous body (180) may be fixed to the first surface (151) through welding (for example, spot welding or the like):

The porous body (180) may have a plurality of flow holes for forming a flow path of a reactive gas (for example, an oxidizing gas). The plurality of flow holes may form regular or irregular flow paths of the reactive gas and the generated water.

In addition, the second separating plate (150) may be provided with a gasket (G) for sealing the reaction zone, the inlets/outlets, and the like, and may be provided with a cell voltage monitoring terminal (155).

Also, the plurality of second protrusions (171) may be provided at the edge of the second separating plate (150) (the position corresponding to the distribution zone of the first separating plate) so as not to be in the reaction zone (160). Furthermore, the second separating plate (150) may be provided with a distribution zone (170) formed by the plurality of second protrusions (171) at a position corresponding to the distribution zone (130) of the first separating plate (110).

The distribution uniformity of the reactive gases (fuel gas, oxidizing gas) can be improved through the distribution zones (130, 170).

Also, the second separating plate (150) is provided with fuel gas inlets/outlets (191), cooling water inlets/outlets (192), and oxidizing gas inlets/outlets (193) located on both sides in the width direction of the first channel, respectively.

Furthermore, the flow direction of the fuel gas in the first separating plate (110) and the flow direction of the oxidizing gas in the second separating plate (150) can be inclined at a predetermined angle. For example, each of the reactive gases can be supplied so that the main flow direction of the fuel gas in the first separating plate (110) and the main flow direction of the oxidizing gas in the second separating plate (150) are substantially orthogonal.

As such, the first separating plate (110) and the second separating plate (150) may have different structures. At this time, as compared with the case where both of anode side/cathode side separating plates are formed as a stamp-molded separating plate, in the case where a porous body is applied to any of the separating plates, one surface forming the cooling water flow path is formed as a flat surface, and thus the depth of the cooling water flow path becomes low. At this time, the cooling water supply flow rate is increased by the increase of the cell performance, whereas the cooling water flow available area is decreased, and thus there may be a problem that the pressure loss of the cooling water flow path (200) increases. At this time, the depth of the cooling water flow path can be increased through the matching structure of the first protrusions (131) and the second protrusions (171).

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

According to the fuel cell stack related to one embodiment of the present invention, the fluid resistance of the cooling water entry part can be reduced and the power consumption of fluid instruments connected to cooling performance improvement and cooling water supply systems can be reduced.

What is claimed is:
1. A fuel cell stack comprising:
a plurality of fuel cells,
wherein each of the plurality of fuel cells comprises:
a membrane-electrode assembly comprising an anode electrode and a cathode electrode;
first and second gas diffusion layers on opposing sides of the membrane-electrode assembly, respectively;
a first separating plate comprising a first surface facing the anode electrode and contacting the first gas diffusion layer and a second surface opposite to the first surface of the first separating plate; and
a second separating plate comprising a first surface facing the cathode electrode and contacting the second gas diffusion layer and a second surface opposite to the first surface of the second separating plate,
wherein at least one of the second surface of the first separating plate and the second surface of the second separating plate comprises one or more protrusions protruding therefrom,
the plurality of fuel cells comprises a first fuel cell and a second fuel cell that is stacked on the first fuel cell and is adjacent to the first fuel cell,
the second surface of the first separating plate of the first fuel cell and the second surface of the second separating plate of the second fuel cell face each other,
the second surface of the first separating plate of the first fuel cell and the second surface of the second separating plate of the second fuel cell are spaced apart from each other by the one or more protrusions such that a space for a flow of cooling water is defined therebetween,
the second fuel cell further comprises a reaction zone on the first surface of the second separating plate of the second fuel cell, and the reaction zone comprises a porous body comprising a plurality of holes for a flow of oxidizing gas, the porous body is bonded onto a bonding portion of the first surface of the second separating plate of the second fuel cell, and the bonding portion is a flat surface, the first surface of the first separating plate of the first fuel cell comprises a second reaction zone comprising a plurality of first channels for a flow of a fuel gas, and the second surface of the first separating plate of the first fuel cell comprises a second channel between two adjacent ones of the plurality of first channels for the flow of the cooling water, and wherein the second surface of the second separating plate comprises a first portion and a second portion, the first portion of the second surface of the second separating plate comprises the one or more protrusions when the second surface of the second separating plate comprises the one or more protrusions, and the second portion of the second surface of the second separating plate faces the first separating plate opposite the second reaction zone, and an entirety of the second portion of the second surface of the second separating plate is flat and is devoid of protrusions and channels.

2. The fuel cell stack according to claim 1, wherein the second surface of the first separating plate of the first fuel cell comprises one or more first protrusions protruding outwardly, and the second surface of the second separating plate of the second fuel cell comprises one or more second protrusions protruding outwardly to be in contact with the one or more first protrusions.

3. The fuel cell stack according to claim 2, wherein the space for the flow of the cooling water has a thickness greater than a sum of heights of one of the one or more first protrusions and one of the one or more second protrusions.

4. The fuel cell stack according to claim 1, wherein the plurality of first channels and the second channel extend in a direction of the flow of the fuel gas.

5. The fuel cell stack according to claim 1, wherein the two adjacent ones of the plurality of first channels are connected through the second channel.

6. The fuel cell stack according to claim 2, wherein the first surface of the first separating plate of the first fuel cell further comprises one or more third protrusions protruding outwardly, and the one or more third protrusions are adjacent to an edge of the first separating plate of the first fuel cell and are spaced apart from the second reaction zone.

7. The fuel cell stack according to claim 6, wherein the one or more third protrusions are at one side of the second reaction zone and are in a distribution zone configured to distribute the fuel gas to the plurality of first channels of the second reaction zone.

8. The fuel cell stack according to claim 1, wherein the second channel of the first separating plate is spaced apart from the second surface of the second separating plate of the second fuel cell.

9. The fuel cell stack according to claim 2, wherein the one or more first protrusions are adjacent to an edge of the first separating plate of the first fuel cell and are spaced apart from the second channel for the flow of the cooling water.

10. The fuel cell stack according to claim 1, wherein a first direction of a flow of a fuel gas in the first separating plate and a second direction of the flow of the oxidizing gas in the second separating plate form a predetermined angle.

11. The fuel cell stack according to claim 6, wherein the second reaction zone is devoid of the one or more third protrusions.

* * * * *